Patented May 15, 1923.

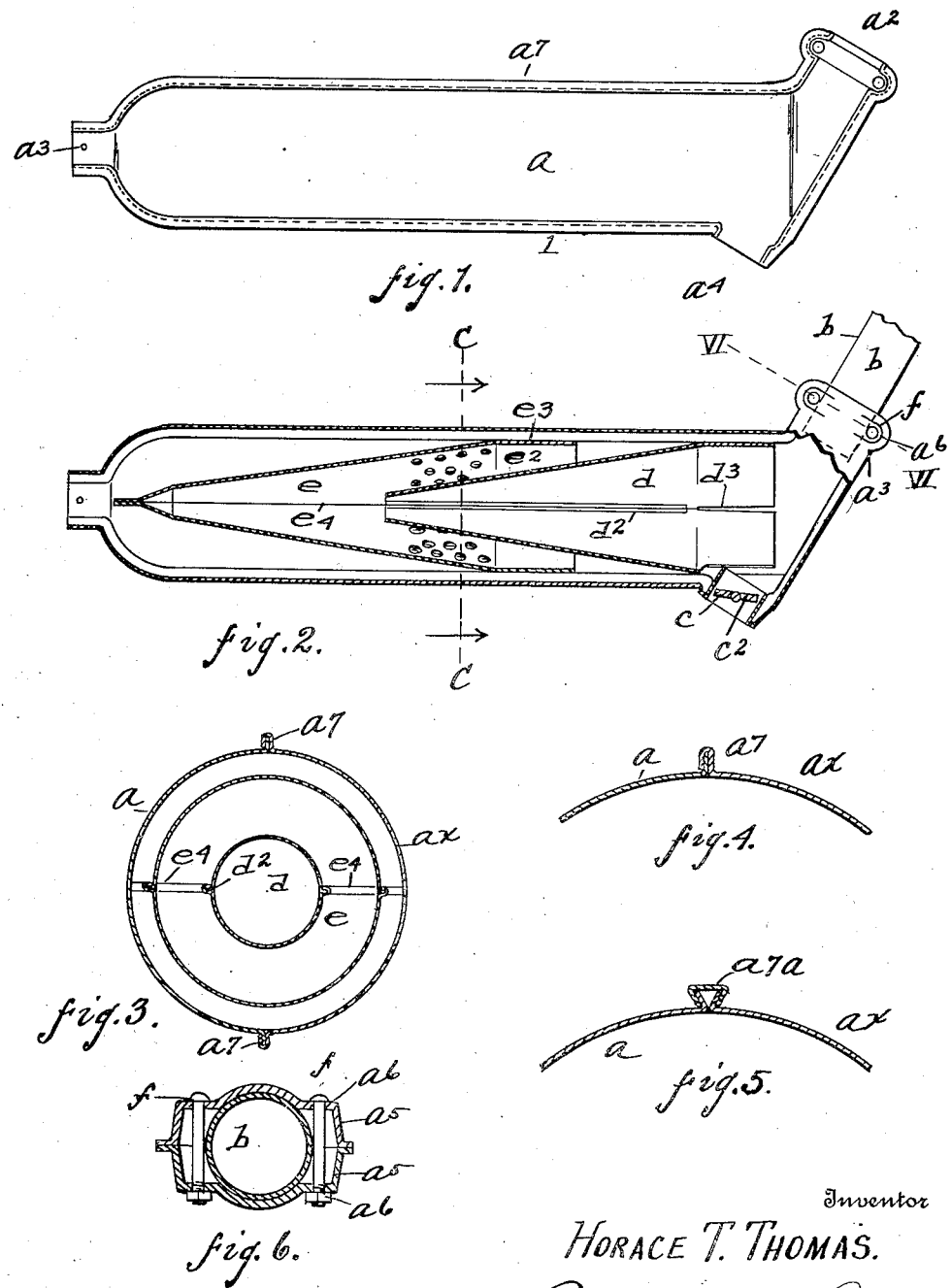

1,454,986

UNITED STATES PATENT OFFICE.

HORACE T. THOMAS, OF LANSING, MICHIGAN.

MUFFLER FOR INTERNAL-COMBUSTION ENGINES.

Application filed September 7, 1918. Serial No. 252,997.

*To all whom it may concern:*

Be it known that I, HORACE T. THOMAS, citizen of the United States, residing at Lansing, county of Ingham, State of Michigan, have invented a certain new and useful Improvement in Mufflers for Internal-Combustion Engines, and declare the following to be a full, clear, and exact description of the same, such as will enable others skilled in the art to which it pertains to make and use the same, reference being had to the accompanying drawings, which form a part of this specification.

My invention relates to mufflers for internal combustion engines, and objects of my improvement are, to provide a sheet metal muffler and a muffler that may be easily and cheaply assembled and when so assembled shall not be liable to deformation or to become loose from its attachment. I secure these objects in the device illustrated in the accompanying drawing, in which:—

Fig. 1, is an orthographic projection of one integral part of a casing embodying my invention.

Fig. 2, is a view of the assembled device broken away to show the interior construction.

Fig. 3, is a section on the line C—C of Fig. 2.

Fig. 4, is a detail sectional view to an enlarged scale, showing the joint between the constituent parts of the outer shell.

Fig. 5, is a view similar to Fig. 4, showing a modified form of the joint.

Figure 6 is a detail cross section on the line VI—VI Figure 2.

The outer shell is made up of two approximately semi-cylindrical parts $a$ and $ax$ which are duplicates of each other except that one is adapted to form one side of the casing and the other the other side thereof. It will therefore only be necessary to describe one side.

The constituent parts of the outer casing are made of sheet metal, stamped to form a body or main portion semi-cylindrical in cross section contracted at one end to form the discharge nozzle $a^3$ and provided at the other end with a diagonally upward extending portion $a^2$ adapted to form a part of a clamp for securing the casing to the exhaust pipe on an engine. Opposite the portion $a^2$ and axially in line therewith is an outwardly opening orifice $a^4$. Extending around the edges of the parts $a$ and $ax$ are outwardly extending flanges $a^7$, by which the two parts are joined together edge to edge as illustrated in Figs. 3, 4 and 5. The flange $a^7$, upon one of these parts may be broader than the corresponding flange on the other part and may be bent over said other flange to secure the two parts together as illustrated in Figs. 3 and 4; or the two flanges may be of equal breadth and diverge outwardly as shown in Fig. 5. In this case a separate strip $a^7a$ is bent over the two flanges to secure the parts together.

$b$ shows the end of the exhaust pipe from the engine. The parts $a^2$ have lugs $a^5$, $a^5$, formed on them as shown in Fig. 6. These lugs are bent out of the material of the outer casing so as to have meeting edges capable of forming a tight joint and parallel surfaces $a^6$, $a^6$, thru apertures in which, bolts $f$, $f$, may pass, a head of a bolt resting on one of said surfaces and the nut at the other end of said bolt engaging the other of said surfaces. By screwing up the nut the casing is firmly clamped to the exhaust pipe. $c$ is a ferrule or short piece of tubing having a valve $c^2$ pivoted therein.

$d$ and $e$ are sheet metal cones, the larger ends of which are cylindrical and adapted to fit against the cylindrical surface of the outer casing within and coaxial with said casing. These cones are provided with slots $d^3$, in the walls of their cylindrical ends so as to permit of a slight variation in diameter, so that they shall fit themselves accurately to the interior surface of the outer casing. The cone $d$, has its larger and open end adjacent to the exhaust pipe $b$ of the engine. Its other and smaller end is also open and extends into the cone $e$ beyond a foraminous portion $e^2$ of the wall of the cone $e$; said cones are made up of two portions dividing in an axial plane at $b^2$ and $e^4$ respectively. These portions are welded together at their edges to form the completed cone.

In assembling one-half $a$ of the outer casing is taken and the cones $d$ and $e$ are placed therein in their proper position their cylindrical ends being welded to the wall of the casing. The ferrule $c$ is also placed in position with the valve $c^2$ therein and the ferrule may be secured in place by welding. The portion $a$, is then placed with its edges against the portion $ax$ and is bound thereto by the outwardly turned flanges as shown at $a^7$ or $a^7a$.

Other forms of baffles than the cones $d$ and $e$ may be used if desired.

By the above construction I provide a muffler that may be cheaply made and readily assembled and one in which the parts are generally of uniform thickness and in which unequal heating of adjacent parts is avoided; thus the danger of strains causing loose joints and leakage is avoided and a light and strong construction secured.

The ferrule $c$ is located axially in line with the end $b$ of the exhaust pipe and when the valve $c^2$ is open the muffler is cut out and the jet of exhaust gases is projected directly into the outer air without being deflected or obstructed.

What I claim is:

1. A cylindric muffler composed of two semi-cylindrical complementary halves of pressed steel seamed together and having inlet and outlet openings, each of the halves carrying baffle plate sections fastened to it and extending diametrically across the muffler.

2. A muffler formed of semi-cylindrical complementary halves of pressed steel joined by longitudinal seams and enclosing baffle cone sections each of which are attached to one only of said halves.

3. An internal combustion engine muffler having a shell composed of two or more complementary shallow long stampings seamed together longitudinally, suitable openings formed by the proper shaping of said stampings near their ends and sectional baffles of sheet metal attached to each of the shell portions and extending across the muffler diameter as well as projecting some distance longitudinally.

4. A muffler casing comprising sheet metal constituent parts, a clamping socket formed partly in one of said parts and partly in the other, the portion of said socket in one of said parts being movable relative to the portion of said socket in the other of said parts, lugs struck up from the material of which the walls of said socket are composed, having registering edges and parallel surfaces apertures thru said parallel surfaces and a clamping bolt passing thru said apertures.

In testimony whereof, I sign this specification.

HORACE T. THOMAS.